(12) United States Patent
Sicard

(10) Patent No.: US 12,535,368 B2
(45) Date of Patent: Jan. 27, 2026

(54) APPARATUS FOR DETERMINING TEMPERATURE

(71) Applicant: NXP USA, INC., Austin, TX (US)

(72) Inventor: Thierry Michel Alain Sicard, Auzeville tolosane (FR)

(73) Assignee: NXP USA, Inc., Austin, TX (US)

( * ) Notice: Subject to any disclaimer, the term of this patent is extended or adjusted under 35 U.S.C. 154(b) by 409 days.

(21) Appl. No.: 18/186,414

(22) Filed: Mar. 20, 2023

(65) Prior Publication Data

US 2023/0304872 A1 Sep. 28, 2023

(30) Foreign Application Priority Data

Mar. 22, 2022 (EP) ..................................... 22305340

(51) Int. Cl.
*G01K 15/00* (2006.01)
*G01K 7/01* (2006.01)

(52) U.S. Cl.
CPC ............ *G01K 15/005* (2013.01); *G01K 7/01* (2013.01)

(58) Field of Classification Search
CPC ...... H03K 3/011; H03K 17/14; H03K 17/687; H03K 17/6871; G05F 3/225; G05F 3/26; G05F 3/267; G05F 3/30; G01K 15/00; G01K 15/005; G01K 7/00; G01K 7/01; G01K 7/021; G01K 7/16
USPC ................................................ 327/513, 539
See application file for complete search history.

(56) References Cited

U.S. PATENT DOCUMENTS

| | | |
|---|---|---|
| 6,218,822 B1 | 4/2001 | MacQuigg |
| 7,170,274 B2 | 1/2007 | Mukherjee et al. |
| 7,710,096 B2 | 5/2010 | Kotchkine et al. |
| 10,648,870 B2 * | 5/2020 | Goumballa ............ G01K 7/16 |
| 10,976,763 B2 * | 4/2021 | Krishnan ............... G05F 1/468 |
| 2007/0279029 A1 | 12/2007 | Cave |
| 2015/0226614 A1 | 8/2015 | Matsumoto et al. |
| 2015/0247764 A1 | 9/2015 | Camarena et al. |

(Continued)

OTHER PUBLICATIONS

Rincon-Mora, G., "A 1.1-V Current-Mode and Piecewise-Linear Curvature-Corrected Bandgap Reference", IEEE Journal of Solid-State Circuits, vol. 33, No. 10, Oct. 1998.

(Continued)

*Primary Examiner* — Hai L Nguyen

(57) ABSTRACT

An apparatus for determining temperature including a PTAT circuit configured to provide a PTAT voltage proportional to absolute temperature, a bandgap voltage reference circuit configured to generate a voltage across a sense-resistor wherein a reference voltage is provided between a first terminal and a second terminal which couple to the sense-resistor, and a calibration circuit, including a memory to store a predetermined calibration value, a trim circuit to receive a trim value based on the predetermined calibration value to control where one or both of the first and second terminals couple to the sense-resistor for provision of the reference voltage, and a dynamic calibration module configured to, based on a change in the PTAT voltage, generate the trim value by adding or subtracting a predetermined number of bits from the predetermined calibration value. The apparatus provides a signal indicative of temperature based on the PTAT voltage and the reference voltage.

20 Claims, 3 Drawing Sheets

(56) References Cited

U.S. PATENT DOCUMENTS

2016/0238464 A1     8/2016    Eberlein
2022/0179441 A1     6/2022    Sicard

OTHER PUBLICATIONS

Abbasi, M., "A high PSRR, ultra-low power 1.2V curvature corrected Bandgap reference for wearable EEG application", 2015 IEEE 13th International New Circuits and Systems Conference (NEWCAS), DOI: 10.1109/NEWCAS.2015.7182036, Jun. 7-10, 2015.

Bai, X., "A Practical Curvature-corrected Technique for Bipolar Bandgap", 2006 8th International Conference on Solid-State and Integrated Circuit Technology Proceedings, DOI: 10.1109/ICSICT. 2006.306403, Oct. 23-26, 2006.

Guo, X., "A low power op-ampless bandgap reference with second-order compensation", 2017 International Conference on Electron Devices and Solid-State Circuits (EDSSC), DOI: 10.1109/EDSSC. 2017.8126434, Oct. 18-20, 2017.

Jing-Hu, L., "A 10ppm/° C 1. 8V Piecewise Curvature-corrected Bandgap Reference in 0.5μm CMOS", 2009 Asia Pacific Conference on Postgraduate Research in Microelectronics & Electronics (PrimeAsia), DOI: 10.1109/PRIMEASIA.2009.5397355, Jan. 19-21, 2009.

Koudounas, S., "A novel CMOS Bandgap reference circuit with improved high-order temperature compensation", Proceedings of 2010 IEEE International Symposium on Circuits and Systems, DOI: 10.1109/ISCAS.2010.5537621, May 30, 2010-Jun. 2, 2010.

Li, Y., "A 0.6 ppm/° C current-mode bandgap with second-order temperature compensation", 2011 9th IEEE International Conference on ASIC, DOI: 10.1109/ASICON.2011.6157348, Oct. 25-28, 2011.

Paul, R., "Design of Second-Order Sub-Bandgap Mixed-Mode Voltage Reference Circuit for Low Voltage Applications", 18th International Conference on VLSI Design held jointly with 4th International Conference on Embedded Systems Design, DOI: 10.1109/ICVD.2005.76, Jan. 3-7, 2005.

\* cited by examiner

APPARATUS FOR DETERMINING TEMPERATURE

CROSS-REFERENCE TO RELATED APPLICATIONS

This application claims the priority under 35 U.S.C. § 119 of European Patent application no. 22305340.6, filed on 22 Mar. 2022, the contents of which are incorporated by reference herein.

FIELD

The present disclosure relates to an apparatus for determining temperature and, in particular to an apparatus for determining temperature having a dynamic calibration module. It also relates to a method.

BACKGROUND

A bandgap voltage reference circuit may generate a reference voltage having a small temperature dependence.

SUMMARY

According to a first aspect of the present disclosure there is provided an apparatus for determining temperature comprising:
  a proportional to absolute temperature, PTAT, circuit configured to provide a PTAT voltage comprising a voltage proportional to absolute temperature;
  a bandgap voltage reference circuit, BGVR circuit, configured to generate a voltage across a sense-resistor wherein a reference voltage is provided between a first terminal and a second terminal of the BGVR circuit, wherein the first terminal and the second terminal couple to the sense-resistor;
  a calibration circuit for calibrating the BGVR circuit, comprising:
    a memory configured to store a predetermined calibration value as a digital word comprising a plurality of bits for use in calibration of the bandgap voltage reference circuit;
    a trim circuit configured to receive a trim value based on the predetermined calibration value to control where one or both of the first terminal and the second terminal couple to the sense-resistor for said calibration and the provision of the reference voltage;
    a dynamic calibration module configured to receive the PTAT voltage and based on detection of a change in the PTAT voltage, generate the trim value by one of adding or subtracting a predetermined number of bits from the predetermined calibration value and provide the generated trim value to the trim circuit;
  wherein the apparatus comprises an output configured to provide a signal indicative of temperature based on the PTAT voltage and the reference voltage.

In one or more examples, the dynamic calibration module includes a logic module to determine the predetermined number of bits to one of add or subtract from the predetermined calibration value based on the PTAT voltage.

In one or more examples, the apparatus includes predetermined calibration value modification logic configured to receive the predetermined calibration value from the memory and add or subtract the predetermined number of bits determined by the logic module.

In one or more examples, the logic module is configured to determine which of a plurality contiguous voltage ranges the PTAT voltage is within and wherein the predetermined number of bits to one of add or subtract from the predetermined calibration value is based on the determined voltage range, wherein each voltage range of the plurality contiguous voltage ranges is associated with a word defining the predetermined number of bits to one of add or subtract.

In one or more embodiments, the predetermined number of bits added to or subtracted from the predetermined calibration value by the dynamic calibration module comprise a subset of the plurality of bits of the digital word.

In one or more examples, the apparatus comprises an apparatus for determining temperature of a battery pack.

In one or more embodiments, the subset comprises the least significant bits and wherein the least significant bits of the predetermined calibration value and trim value provide for fine control of the reference voltage generated by the BGVR circuit and the most significant bits of the predetermined calibration value and trim value provide for course control of the reference voltage generated by the BGVR circuit.

Thus, the trim circuit may be configured to provide for two or more connections to the sense-resistor that are close together and thereby provide a small difference in the voltage detected at them and wherein the trim circuit is configured to selectively couple one of the first terminal and the second terminal to the two or more connections based on the least significant bits of the trim value. Likewise, the trim circuit may be configured to provide for two or more second connections to the sense-resistor that are further apart and thereby provide a larger difference in the voltage detected at them and wherein the trim circuit is configured to selectively couple one of the first terminal and the second terminal to the two or more second connections based on the most significant bits of the trim value.

In one or more embodiments, the memory is configured to store the trim value generated by the dynamic calibration module as a current trim value, and wherein based on the detection, by the dynamic calibration module, of the change in the PTAT voltage, the dynamic calibration module is configured to generate a next trim value by one of adding a least significant bit to, or subtracting a least significant bit from, the current trim value and is configured to provide the generated next trim value to the trim circuit.

In one or more embodiments, the dynamic calibration module is configured to determine a current voltage range, the current voltage range comprising a voltage range of a contiguous set of voltage ranges that the PTAT voltage is within, wherein each voltage range is defined by a lower limit voltage and an upper limit voltage; and
  wherein said detection of the change in the PTAT voltage by the dynamic calibration module comprises detection of a change in the PTAT voltage that results in the PTAT voltage leaving the current voltage range of the contiguous set of voltage ranges; and
  wherein at least two voltage ranges of the set of voltage ranges corresponds to the addition or the subtraction of a different predetermined number of bits from the predetermined calibration value to generate the trim value.

In one or more embodiments, the dynamic calibration module comprises:
  a first comparator configured to receive the PTAT voltage and the upper limit voltage for the current voltage range and determine if the PTAT voltage is outside the current voltage range by virtue of it being greater than the upper limit voltage of the current voltage range; and a second comparator configured to receive the PTAT voltage and the lower limit voltage for the current voltage range and determine if the PTAT is outside the current voltage range by virtue of it being less than the lower limit voltage of the current voltage range; and wherein the dynamic calibration module is configured to:

(i) change the trim value based on the output of one or both of the first comparator and the second comparator indicating the PTAT voltage has changed to a new PTAT voltage that is outside the current voltage range;

(ii) update the current voltage range to an adjacent voltage range in the contiguous set of voltage ranges and thereby change the lower limit voltage and the upper limit voltage provided to the first comparator and the second comparator to those associated with said adjacent voltage range.

In one or more embodiments, the dynamic calibration module is configured to provide a start-up-routine, the start-up-routine comprising:

stepping through the contiguous set of voltage ranges by defining a candidate voltage range as different ones of the set of voltage ranges until one or both of the first comparator and second comparator are indicative of the PTAT voltage being within the candidate voltage range.

In one or more embodiments, the dynamic calibration module includes a circuit configured to generate a reference voltage across a second sense-resistor, the second sense-resistor comprising a voltage divider having a plurality of voltage tapping points that are provided to define the upper limit voltage and the lower limit voltage for each of the contiguous set of voltage ranges; and wherein the dynamic calibration module includes a plurality of switches configured to:

couple the first comparator to one of the voltage tapping points corresponding to the upper limit voltage for the current voltage range; and couple the second comparator to a different one of the voltage tapping points corresponding to the lower limit voltage for the current voltage range.

In one or more embodiments, the dynamic calibration module comprises:

a first comparator configured to determine when the PTAT voltage increases;

a second comparator configured to determine when the PTAT voltage decreases;

a third comparator configured to determine whether the PTAT voltage is above or below a predetermined threshold;

and wherein the dynamic calibration module is configured to:

if the third comparator determines that the PTAT voltage is below the predetermined threshold, an increase in the PTAT voltage determined by the first comparator is configured to provide for the adding or subtracting the one or more bits to the predetermined calibration value to generate the trim value such that it deviates less from the predetermined calibration value and a decrease in the PTAT voltage determined by the second comparator is configured to provide for the adding or subtracting of the one or more bits from the predetermined calibration value to generate trim value that deviates more from the predetermined calibration value; and if the third comparator determines that the PTAT voltage is above the predetermined threshold, an increase in the PTAT voltage determined by the first comparator is configured to provide for adding or subtracting of the one or more bits from the predetermined calibration value to generate the trim value such that it deviates more from the predetermined calibration value and a decrease in the PTAT voltage determined by the second comparator is configured to provide for adding or subtracting of the one or more bits to the predetermined calibration value to generate the trim value such that it deviates less from the predetermined calibration value.

In one or more embodiments, the trim circuit comprises at least a first switch and a second switch, wherein the first switch is configured to selectively couple the first terminal to a plurality of different positions along the sense-resistor, and the second switch is configured to selectively couple the second terminal to a plurality of different positions along the sense-resistor, wherein the position to which each of the first switch and second switch selectively couple along the sense-resistor determine the resistance thereof and thereby the reference voltage provided between the first terminal and the second terminal.

In one or more embodiments, the dynamic calibration module includes a logic module configured to receive the output of at least the first comparator and the second comparator and generate a control signal to add or subtract bits from the predetermined calibration value to generate the trim value.

In one or more embodiments, the BGVR circuit comprises a first transistor, a second transistor, and a comparator, wherein the first transistor comprises a first terminal coupled to a voltage supply terminal, a second terminal coupled to a first terminal of the sense-resistor, and a third, control, terminal coupled to the output of the comparator;

the second transistor comprises a first terminal coupled to a second terminal of the sense-resistor, a second terminal of the second transistor coupled to a reference voltage terminal, and a third, control, terminal coupled to an input of a summing module that provides the PTAT voltage;

wherein the summing module is configured to provide the PTAT voltage at its output to a first terminal of the comparator and wherein the input to the summing module is coupled to one of the first terminal and the second terminal of the BGVR circuit; and wherein a second terminal of the comparator is coupled to the other of the first terminal and the second terminal of the BGVR circuit, and the second terminal of the comparator also couples to the PTAT circuit.

In one or more embodiments, the PTAT circuit comprises: the summing module and a follower arrangement comprising:

a first transistor having a first terminal coupled to a voltage supply terminal a second terminal coupled to a PTAT output and a control terminal coupled to the comparator of the BGVR circuit;

a second transistor having a first terminal coupled to the voltage supply terminal and a third transistor, a second terminal coupled to the PTAT output and a control terminal coupled to the third transistor;

wherein the PTAT output is coupled to the reference voltage terminal via a direct current source and wherein the PTAT voltage is provided between the direct current source and the second terminals of the first and second transistors.

In one or more embodiments, at least one of the voltage ranges of the set of contiguous voltage ranges differs in size in terms of the voltage range between the lower limit voltage and the upper limit voltage than one other of the voltage ranges of the set of contiguous voltage ranges.

According to a second aspect of the disclosure we provide a method of operating the apparatus of the first aspect, wherein the method comprises:

receiving the PTAT voltage;

detecting a change in the PTAT voltage, generating the trim value by one of adding or subtracting a predetermined number of bits from the predetermined calibration value and providing the generated trim value to the trim circuit; and outputting a signal indicative of temperature based on the PTAT voltage and the reference voltage.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets.

The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

A bandgap voltage reference may be used as part of a temperature measurement apparatus, as will be known to those skilled in the art. The accuracy of the bandgap voltage reference and, in particular, the degree of invariance in the voltage reference it provides, despite changes in temperature, impacts the accuracy of the measured temperature. As will be known, the output of a practical bandgap voltage reference, includes a curvature (when plotted graphically) in the voltage output with temperature. In some examples, this "curvature" results in around 1.5 mV variation in the voltage reference for a 120 C temperature range. For some applications this variation is much too big.

A bandgap voltage reference circuit is typically calibrated at manufacture such that it provides a predetermined "calibrated" output at a single temperature.

For example, the bandgap voltage reference circuit may be calibrated to provide the predetermined output at room temperature, such as 20° C. In one or more examples described herein a predetermined calibration value may be stored in a memory and used to calibrate (such as by scaling or offsetting the output of the bandgap voltage reference circuit) to the predetermined output.

In one or more of the present example embodiments, an apparatus is provided that includes a memory for storing a predetermined calibration value of the bandgap voltage reference and, in particular, circuitry to provide for dynamic calibration during use in response to temperature.

Figure 1:
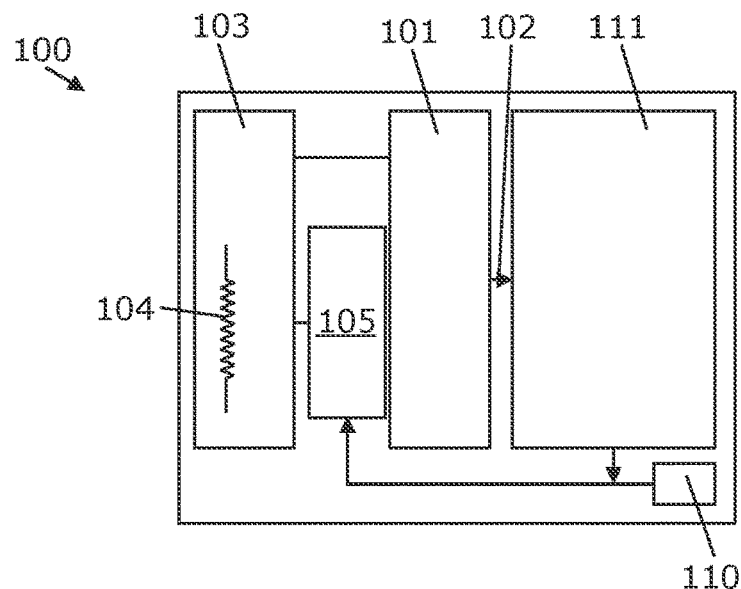
FIG. 1 shows an example embodiment of an apparatus.
Figure 2:
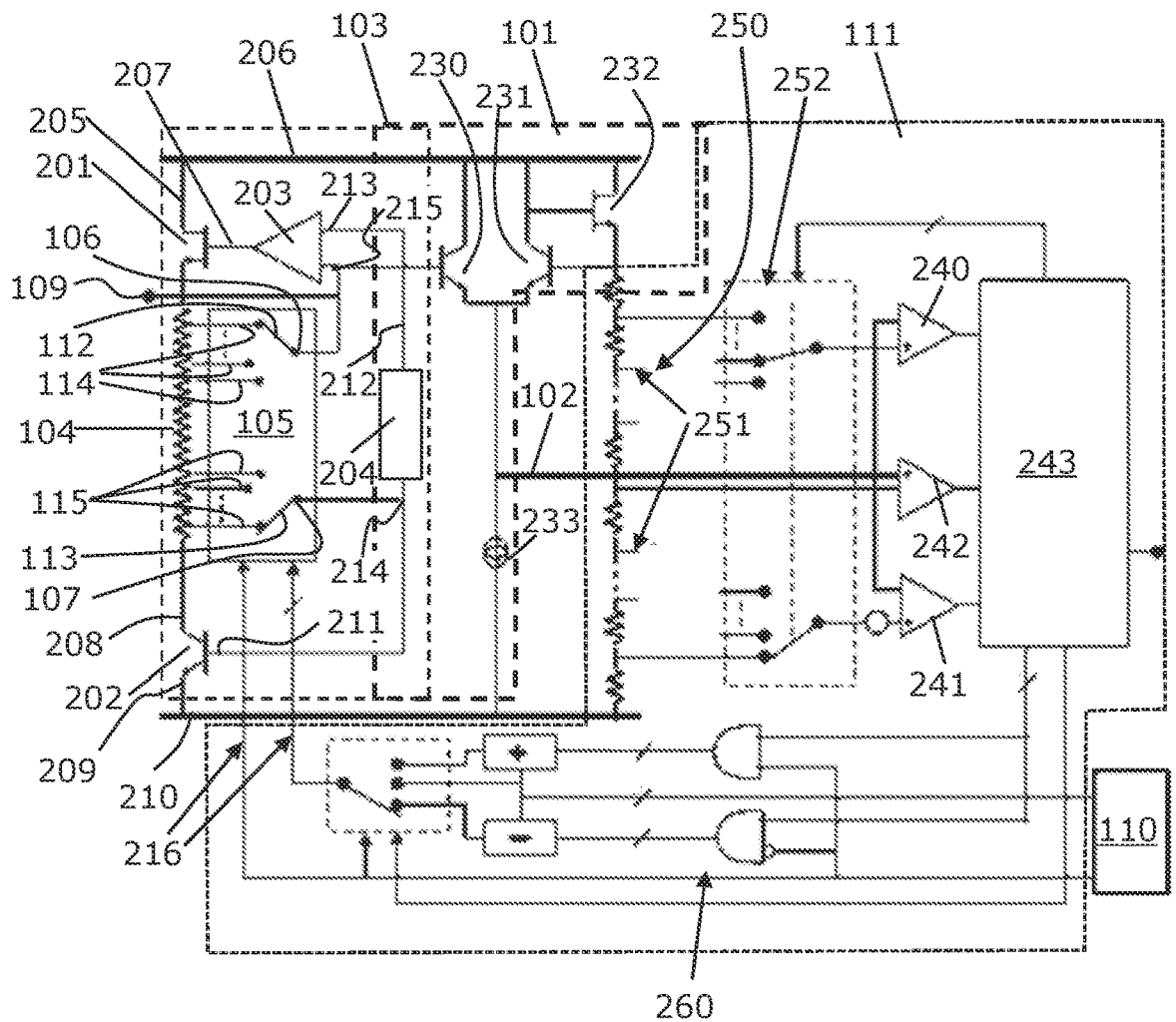
FIG. 2 shows a further example embodiment of the apparatus in more detail.

FIG. 1 shows an example apparatus 100 for determining temperature. FIG. 2 shows a more detailed example of the apparatus 100 and the same reference numerals have been used to designate similar parts. The apparatus 100 comprises a proportional to absolute temperature, PTAT, circuit 101. As will be known to those skilled in the art, a PTAT circuit provides a PTAT voltage output, at terminal 102 in FIG. 2, that is a voltage proportional to absolute temperature.

The apparatus 100 further comprises a bandgap voltage reference circuit 103, referred to hereinafter as BGVR circuit. The BGVR circuit 103 is configured to generate a voltage across a sense-resistor 104. The voltage generated over the sense-resistor 104 requires calibration to ensure its output is at a predetermined value at a particular temperature and therefore its output over its operating range of temperatures is within a known tolerance. In some examples, the sense-resistor 104 may be physically modified to achieve this. However, in the present example, the reference voltage is provided between a first terminal 106 and a second terminal 107 of the BGVR circuit 103, wherein the first terminal and the second terminal couple to the sense-resistor 104. Thus, the first terminal 106 and the second terminal 107 couple at different locations along the length of the sense-resistor and thus act as a voltage divider and provide a reference voltage that is based on the voltage across the sense-resistor as a whole. As can be appreciated, the positions at which the first terminal 106 and second terminal 107 couple to the sense-resistor over its length may be controlled and therefore provides the calibration. The reference voltage between the first terminal 106 and second terminal 107 is thus a controlled fraction of the voltage across the whole sense-resistor 104. The output of the reference voltage is provided at terminal 109.

The apparatus 100 further comprises a calibration circuit comprising a memory 110, a trim circuit 105 and a dynamic calibration module 111.

The memory 110 may configured to store a predetermined calibration value. The predetermined calibration value may be a scaling factor, offset or instruction that calibrates the reference voltage output by the BGVR circuit 103. The calibration value may be used to make the reference voltage output by the BGVR circuit 103 a calibrated voltage value at a particular temperature. In some examples, the effect of the calibration value is satisfactory even when the actual temperature deviates from the particular temperature. However, in other examples, the use of a single calibration value to calibrate the reference voltage output at a single temperature (or two temperatures in some examples if we consider the typical curve of a bandgap voltage reference circuit) does not provide sufficient accuracy.

In the present example, the predetermined calibration value is stored as a digital word comprising a plurality of bits for use in calibration of the bandgap voltage reference circuit 103. In the present example 7 bits are used and thus the predetermined calibration value stored in the memory comprises a 7 bit word.

The trim circuit 105 is configured to receive a trim value based on the predetermined calibration value to control where one or both of the first terminal 106 and the second terminal 107 couple to the sense-resistor 104 for said calibration and the provision of the reference voltage. Thus, the trim circuit 105 may be configured to determine where along the sense-resistor 104 the first terminal 106 couples and thus from where the reference voltage is tapped. The trim circuit 105 may be configured to determine where along the sense-resistor 104 the second terminal 107 couples and thus from where the reference voltage is tapped. It will be appreciated that in some examples, both the first terminal 106 and the second terminal are configurable in terms of where along the sense-resistor 104 they couple. In other examples, only one of the first terminal 106 and the second terminal 107 are configurable.

In one or more examples, the trim circuit 105 comprises at least a first switch 112 and a second switch 113, wherein the first switch 112 is configured to selectively couple the first terminal 106 to a plurality of different positions, represented by terminals 114, along the sense-resistor 104. The number of different terminal positions 114 and the spacing between them may vary between embodiments depending on the granularity of the control over the voltage reference that is required. The second switch 113 is configured to selectively couple the second terminal 107 to a plurality of different positions, represented by terminals 115, along the sense-resistor 104. The number of different terminal positions 115 and the spacing between them may vary between embodiments depending on the granularity of the control over the voltage reference that is required.

As can be appreciated, the position of the terminals 114, 115 to which each of the first switch 106 and the second switch 107 selectively couple along the sense-resistor 104 determines the resistance of the portion of the sense-resistor between the selected ones of the terminals 114, 115. Thus, by selection of the which of the terminals 114, 115 the first and second switches 106, 107 couple, the reference voltage provided between the first terminal 106 and the second terminal 107 can be controlled and thereby calibrated.

The dynamic calibration module 111 is configured to receive the PTAT voltage from terminal 102. The dynamic calibration module 111 is configured to receive the predetermined calibration value from the memory 110 and generate the trim value by making predetermined adjustments to the predetermined calibration value. Thus, the dynamic calibration module 111 may thus sense temperature and make dynamic adjustments to the predetermined calibration value to generate the trim value, such as in response to the temperature deviating away from the temperature at which the predetermined calibration value was set. Accordingly, the predetermined calibration value provides a first level of calibration and the dynamic calibration module 111 being configured to make adjustments to the predetermined calibration value to generate the trim value provides a second level of calibration, that is a function of temperature.

In the present examples, the dynamic calibration module 111, based on detection of a change in temperature, as represented by a change in the PTAT voltage 102, is configured to generate the trim value by one of adding or subtracting one or more bits from the predetermined calibration value and provide the generated trim value to the trim circuit 105. Thus, given that the voltage reference output by a BGVR circuit 103 is known to follow a curve, the need to add bits or subtract bits will depend on what temperature the predetermined calibration value was configured to provide the calibrated voltage output and whether the change in temperature has the effect of increasing the voltage reference or decreasing the voltage reference. Thus, if the change in temperature has the effect of increasing the voltage reference, then the trim value may be adjusted to cause the trim circuit 105 to connect the first and second terminals 106, 107 to terminals 114, 115 that reduce the voltage reference. Likewise, if the change in temperature has the effect of decreasing the voltage reference, then the trim value may be adjusted to cause the trim circuit 105 to connect the first and second terminals 106, 107 to terminals 114, 115 that increase the voltage reference. Accordingly, in the present and one or more examples, the trim value has the effect of increasing or decreasing the resistance of the resistor (e.g. the portion of the sense-resistor 104) over which the reference voltage is generated by the BGVR circuit 103.

The apparatus 100 also includes an output, which may be considered its principal output, configured to provide a signal indicative of temperature sensed by the apparatus 103. The signal indicative of temperature may be considered accurate because it is based on the PTAT voltage and the reference voltage, which is dynamically calibrated by virtue of the dynamic calibration module 111 making adjustments to the trim value, which cause the trim circuit 105 to adjust where the first and second switches 112, 113 couple to the sense-resistor 104.

Turning to the more detail of FIG. 2, we will describe the BGVR circuit 103 and PTAT circuit 101. It will be appreciated that, in the apparatus 100, the BGVR circuit 103 and PTAT circuit 101 are integrated together to enable the apparatus 100 to provide its output. Thus, the boundaries designated between the BGVR circuit 103 and PTAT circuit 101 are not to be interpreted as strict lines of separation. In practice, it can be understood that there is one combined circuit and there will be a first combination of components therein that work together to provide the reference voltage (i.e. the output of the BGVR circuit) and there will be a second combination of the components that work together to provide the PTAT voltage (i.e. the output of the PTAT circuit), and there may or may not be overlap between the components in those first and second combinations. However, for ease of explanation, the BGVR circuit 103 comprises a first transistor 201, a second transistor 202 and a comparator 203. It will be appreciated that the present examples are primarily concerned with the calibration of the reference voltage output by the BGVR circuit 103 and therefore the BGVR circuit 103 itself may take different forms. As an example, only, the first transistor 201 comprises a Field Effect Transistor or N channel FET. The first transistor 201 comprises a first, drain, terminal 205 coupled to a voltage supply terminal 206; a second, source, terminal coupled to a first terminal of the sense-resistor 104; and a third, gate, terminal coupled to the output of the comparator 203.

The second transistor 202 comprises an NPN bipolar junction transistor and comprises a first, collector, terminal 208 coupled to a second terminal (i.e. at the other end of) of the sense-resistor 104. A second, emitter, terminal 209 of the second transistor 202 is coupled to a reference voltage terminal 210 that may provide a ground. A third, base, terminal 211 is coupled to an input 214 of a summing module 204, which may be considered part of the PTAT circuit 101.

The summing module 204 is configured to determine a sum of the change in the base-emitter voltage of the second transistor 202. The summing module 204 determines a sum of a predetermined number of delta Vbe voltages. As will be familiar to those skilled in the art, the summing module 204 will thus provide a voltage with a positive slope (the PTAT voltage). This PTAT voltage is added with the base emitter voltage (Vbe) of second transistor 202 (which has a negative slope) and therefore provides a zero temperature coefficient at the output 109 (except for the inaccuracy due to the bandgap curve, which is addressed by the module 111 described below). The summing module 204 provides an output at output 212 to a first terminal 213 of the comparator 203. In this example, the input 214 of the summing module 204 is coupled to the second terminal 107 (lower voltage terminal) of the BGVR circuit. Further, a second terminal 215 of the comparator 204 is coupled to both the first terminal 106 (higher voltage terminal) and the PTAT circuit 101. Thus, the comparator 203 provides an output to the first transistor 201 based on a comparison of the output of the summing module 204 and the voltage at the first terminal 106.

The operation of the BGVR circuit 103 will not be described here apart from the output of the reference voltage is controlled by the trim circuit 105 based on the trim value it receives at trim circuit input 216 from the dynamic calibration module 111.

Turning to the PTAT circuit 101, it includes the summing module 204 mentioned above and, in this example, includes a follower amplifier arrangement. It will be appreciated that the present examples are primarily concerned with the calibration of the reference voltage output by the BGVR circuit 103 and therefore the PTAT circuit 101 itself may take different forms. However, in general, the PTAT circuit 101 comprises the summing module 204 and the follower amplifier comprises a first transistor 230 of a differential pair having a first terminal coupled to the voltage supply terminal 206, a second terminal coupled to the PTAT output 102 and a control terminal coupled to the comparator 203 of the BGVR circuit 103.

The PTAT circuit 101 also includes a second transistor 231 of the differential pair having a first, collector, terminal coupled to the voltage supply terminal 206 and to a gate terminal of a third transistor 232. The second transistor 231 comprises a second terminal coupled to the PTAT output 102 and a control, base, terminal coupled to the emitter terminal of the third transistor 232. The collector terminal of the third transistor 232 is coupled to the voltage supply terminal 206. The PTAT output 102 is coupled to the reference voltage terminal 210 via a direct current source 233. The PTAT voltage is provided at the output 102 between the direct current source 233 and the second, emitter, terminals of the first and second PTAT transistors 230, 231. Thus, the PTAT voltage provided at output terminal 102 is provided by a copy of the zero temperature coefficient voltage from BGVR circuit 103 minus a negative slope voltage provided by the base-emitter voltage, Vbe, of the third transistor 230 and the second transistor 231.

As mentioned, although the PTAT circuit 101 and BGVR circuit 103 are described as separate circuits it will be appreciated that the components thereof work together to provide the output of the apparatus 100. Further, the dividing line between the circuits 101, 103 provided in the figure is only an example for the ease of explanation. Considered more generally, the apparatus 100 has a BGVR circuit 103 to provide the reference voltage and a PTAT circuit 101 to provide a PTAT voltage and the use of those circuits and the calibration of the BGVR circuit is the focus of the one or more embodiments herein.

Figure 3:
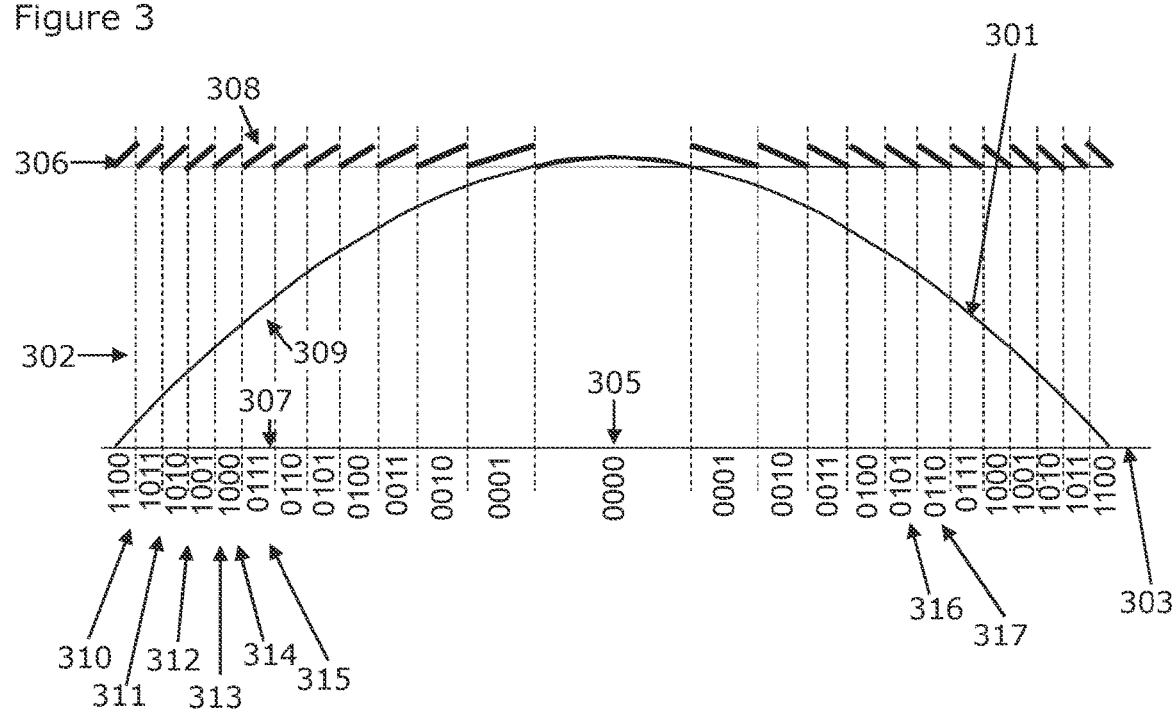
FIG. 3 shows an example bandgap reference voltage curve.

FIG. 3 shows an example "bandgap curve" 301 comprising how the output of the voltage reference 301 from the BGVR circuit varies with temperature. Accordingly, voltage is shown on the y-axis 302 and temperature is represented on the x-axis 303. The y-axis 302, in this example, shows a variation in the voltage reference of about 1695 microvolts over the temperature range shown. The y-axis represents a temperature range of −40° C. to 80° C., i.e. 20° C.±60° C. The predetermined calibration value may be set at 20° C. represented by point 305. Accordingly, at this temperature point 305, the reference voltage is the "calibrated" voltage presented at point 306. It is desirable to keep the reference voltage at the "calibrated" voltage represented by point 306. However, as shown by the curve 301, the reference voltage will, in this example calibration, decrease either side of the temperature point 305.

In one or more examples, the dynamic calibration circuit 111 may be configured to generate a trim value that provides a reference voltage having the voltage at "calibrated" voltage point 306 over a range of temperatures, such as over the entire range shown in FIG. 3. Thus, as an example, at temperature 307, a predetermined number of bits are added or subtracted (whichever causes an increase in the reference voltage due to the action of the trim circuit 105) from the predetermined calibration value to generate the trim value. It can be seen from FIG. 3 that for the temperature 307, the bits 0111 are added to whatever the digital word that represents the predetermined calibration value.

Thus, the predetermined calibration value stored in the memory 110 may be 0011000. The dynamic calibration module 111, based on the PTAT voltage being at temperature 307, may be configured to add 0111 bits. Thus, the trim value comprises:

0011000 (the predetermined calibration value) +0111
(the bits to be added for temperature 307)
=0011111 (the trim value)

By providing the dynamically generated trim value to the trim circuit 105, the BGVR circuit 103 will output a voltage reference with a voltage shown by line 308 rather than a voltage 309 (which would be generated without the dynamic generation of the trim value and instead using the unmodified predetermined calibration value).

The one or more bits added to or subtracted from the predetermined calibration value by the dynamic calibration module 111 comprise a subset of the plurality of bits of the digital word. Thus, in this example, the predetermined calibration value comprises 7 bits and the size of the word that represents the number of bits added or subtracted comprise up to a 4 bit word, that is less than the number of bits of the predetermined calibration value.

In the present example, number of bits added or subtracted from the predetermined calibration value comprise the least significant bits. That is because, in this example, the least significant bits of the predetermined calibration value and trim value provide for fine control of the reference voltage generated by the BGVR circuit and the most significant bits of the predetermined calibration value and trim value provide for course control of the reference voltage generated by the BGVR circuit.

Thus, the trim circuit 105 may be configured such that the two or more connections 115 to the sense-resistor 104 are close together and thereby provide a small difference in the voltage detected at them. Likewise, the trim circuit may be configured such that the two or more second connections 114 to the sense-resistor are further apart and thereby provide a larger difference in the voltage detected at them. The trim circuit 105 may be configured to interpret the digital trim value such that the trim circuit is configured to selectively couple one of the first terminal 106 and the second terminal 107 to the two or more connections 114 based on the least significant bits of the trim value and wherein the trim circuit is configured to selectively couple the other of the first terminal 106 and the second terminal 107 to the two or more second connections 115 based on the most significant bits of the trim value. Thus, the least significant bits of the trim value may be configured to provide for the finest control of the reference voltage.

It will be appreciated that the connections 114, 115 may be arranged with any pattern of spacing and the trim circuit 105 may be configured to interpret the trim value in different ways. However, in one or more examples, the apparatus 100 may be configured to make the finest adjustment to the reference voltage provided by the trim circuit 105 in response to changes in temperature because this will provide the greatest accuracy. In other examples, the finest accuracy may not be necessary and more course adjustments of to where the first and second electrodes 106, 107 couple to the sense-resistor 104 may be made.

In the example of FIG. 3, the number of bits added to or subtracted from the predetermined calibration value is determine by which of a plurality temperature ranges the current temperature lies within. Thus, the dynamic calibration module 111 may be configured to define a contiguous set of voltage ranges 310 to 317. FIG. 3 shows many more ranges but only ranges 310 to 317 are labelled for clarity. The dynamic calibration module 111 thus determines which range 310 to 317 the current temperature is within based on the PTAT voltage. In the present example, if the current temperature is in range 310, the bits 1100 are added to the predetermined calibration value to generate the trim value. In the present example, if the current temperature is in range 311, the bits 1011 are added to the predetermined calibration value to generate the trim value. If the current temperature is in range 312, the bits 1010 are added; if the current temperature is in range 313, the bits 1001 are added; if the current temperature is in range 314, the bits 1000 are added; if the current temperature is in range 315, the bits 0111 are added; if the current temperature is in range 316, the bits 0101 are added; and if the current temperature is in range 317, the bits 0110 are added.

Figure 4:
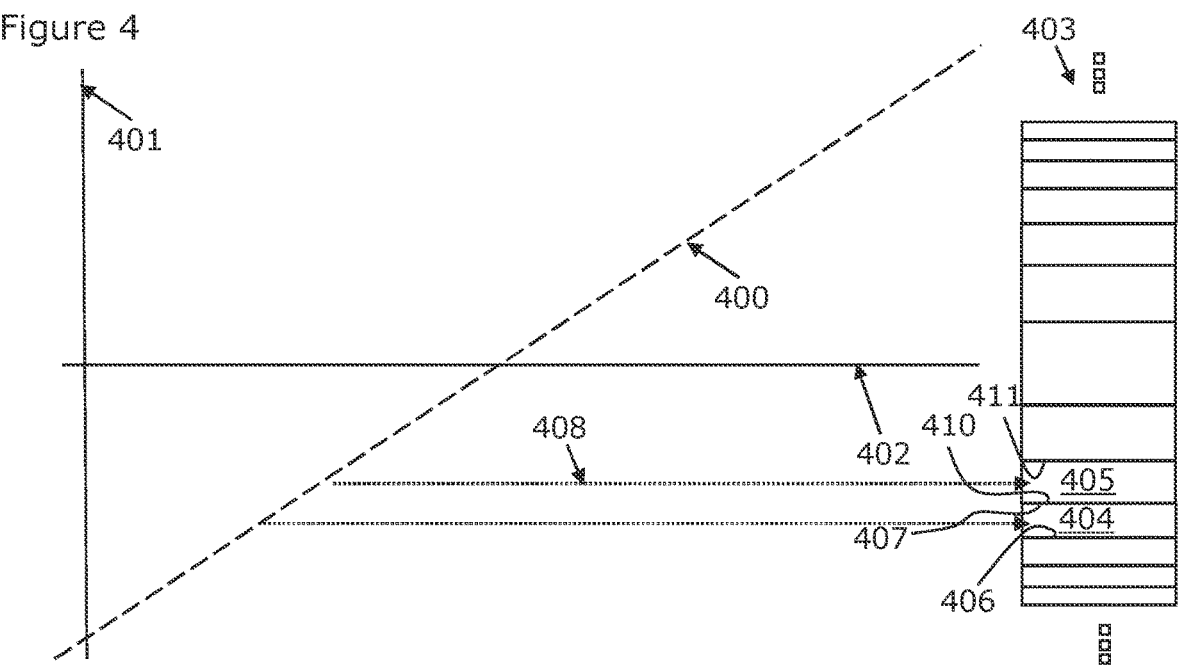
FIG. 4 shows an example proportional to absolute temperature, PTAT, voltage and a set of contiguous voltage ranges.

FIG. 4 shows a graph of the PTAT voltage 400 from terminal 102 received at the dynamic calibration module 111 on the y-axis 401 versus temperature on the x-axis. As expected, the PTAT voltage 400 is substantially linear with temperature. The set of ranges 403 illustrate the contiguous set of voltage ranges and correspond to the ranges 310-317 shown along the x-axis of FIG. 3, although not all of them are shown in FIG. 4.

Each voltage range, taking the range 404 as an example, is defined by a lower limit voltage 406 and an upper limit voltage 407. When the PTAT voltage 400 is in a voltage range 404, that is between the lower limit voltage 406 and the upper limit voltage 407, the dynamic calibration module 111 is configured to add or subtract a predetermined number of bits from the predetermined calibration value to generate the trim value.

The dynamic calibration module 111 is configured to detect a change in the PTAT voltage 400, such as the due to the temperature increasing (or decreasing in other examples) such that the PTAT voltage becomes the value 408. In such an event, the dynamic calibration module 111 is configured to detect a change in the PTAT voltage 400 that results in the PTAT voltage leaving the current voltage range 404 by exceeding the upper limit voltage 406 (or falling below the lower limit voltage in other examples). The current PTAT voltage 408 now lies within an adjacent voltage range 405. The dynamic calibration module 111 is now configured to add or subtract a different predetermined number of bits from the predetermined calibration value to generate the trim value. Thus, for the range 404, the predetermined number of bits may comprise 0011, in this example. For the range 405, the predetermined number of bits may comprise 0010, in this example. With the PTAT voltage now in range 405, the lower limit voltage comprises lower limit voltage 410 and the upper limit voltage comprises upper limit voltage 411. The dynamic calibration module 111 is now configured to detect the change in the PTAT voltage 400 by determining whether it leaves range 405 by exceeding the lower limit voltage 410 or the upper limit voltage 411.

An example of the dynamic calibration module 111 will now be described with reference to FIG. 2, to illustrate how the apparatus 100 may detect the PTAT voltage 400 leaving the current range 404, 405, 310-317 by comparing the PTAT voltage 102 to the current lower limit voltage and the current upper limit voltage for the current range.

Thus, the dynamic calibration module 111 may comprise a first comparator 240 and a second comparator 241. It will be appreciated that other examples may utilise other means of detecting which range 404, 405, 310-317 the PTAT voltage is currently within and monitoring for changes.

The first comparator 240 is configured to receive the PTAT voltage from terminal 102 at a first terminal (in this example the inverting input terminal) and receive the upper limit voltage for the current voltage range at a second terminal (in this example the non-inverting input terminal). Thus, the first comparator 240 may be configured to determine if the PTAT voltage from 102 is outside the current voltage range by virtue of it being greater than the upper limit voltage of the current voltage range.

Likewise, the second comparator 241 is configured to receive the PTAT voltage from terminal 102 at a first terminal (in this example the inverting input terminal) and receive the lower limit voltage for the current voltage range at a second terminal (in this example the non-inverting input terminal). Thus, the second comparator 241 may be configured to determine if the PTAT voltage is outside the current voltage range by virtue of it being less than the lower limit voltage of the current voltage range.

The signal output by the comparators 240, 241 is indicative of whether the PTAT voltage is more than or less than the (upper or lower) voltage limit provided to the comparator. The dynamic calibration module 111 may include a logic module 243 configured to receive the output of at least the first comparator and the second comparator and determine which range of the contiguous set of ranges the PTAT voltage is currently in and generate a corresponding control signal to add or subtract the predetermined number of bits from the predetermined calibration value to generate the trim value. The logic module 243 may also be configured to change the value of the upper and lower voltage limits 406, 407 and 410, 411 provided to the first and second comparators 240, 241 as the temperature represented by the PTAT voltage 102 moves through the ranges 310-317, 403.

Thus, as the signal from the comparators 240 is triggered by a change in the temperature and therefore the PTAT voltage, the dynamic calibration module may be configured to:
  (i) change the trim value based on the output of one or both of the first comparator 240 and the second comparator 241 indicating that the PTAT voltage has changed to a new PTAT voltage that is outside the current voltage range, such as described above in relation to ranges 404 and 405; and (ii) update the current voltage range 404 to an adjacent voltage range 405 in the contiguous set of voltage ranges 403 and thereby change the lower limit voltage (e.g. from 406 to 410) and the upper limit voltage (e.g. from 407 to 411) provided to the first comparator 240 and the second comparator 241.

In the present example, the voltage values provided to the first and second comparators 240, 241 as the lower limit voltage and upper limit voltage are generated by a voltage divider 250 having a plurality of voltage tapping points 251. The dynamic calibration module includes a plurality of switches 252 configured to couple the first comparator 240 to one of the voltage tapping points 251 corresponding to the upper limit voltage for the current voltage range; and couple the second comparator 241 to a different one of the voltage tapping points 251 corresponding to the lower limit voltage for the current voltage range. The switches 252 are controlled by a control signal from the logic module 243. It will be appreciated that other examples (not shown) rather than switching the upper and lower limit voltages provided to the comparators 240, 241, at least a pair of comparators may be provided for each of the voltage ranges 403.

In the present examples, the voltage generated over the voltage divider 250 is provided by the copy of the reference voltage provided by the follower amplifier arrangement described above. Thus, the reference voltage output of the BGVR circuit is copied by the follower amplifier arrangement comprising transistors 230, 231 and 232, which will be familiar to those skilled in the art as a basic follower stage with a high impedance input base terminal of first transistor 230 and a low impedance output provided by the third, NMOS, transistor 232. The voltage divider comprises a second sense-resistor having the plurality of voltage tapping points 251 (only two labelled for clarity) that are provided at predetermined points along the second sense resistor to define the upper limit voltages and the lower limit voltages for each of the ranges in the contiguous set of voltage ranges.

The apparatus 100 may be configured to operate in numerous different ways. For example, the dynamic calibration module 111 may be configured to make an absolute determination of which range the PTAT voltage is currently in and then provide for addition or subtraction of a predetermined number of bits corresponding to the determined range. In other examples, the dynamic calibration module 111 may be configured to relative changes in PTAT voltage rather than the absolute PTAT value.

Thus, in one or more examples, the memory 110 is configured to store the trim value generated by the dynamic calibration module 111 as a current trim value. That is the trim value that applies the voltage range 310-317, 403 the PTAT voltage is currently within. Then, based on the detection, by the dynamic calibration module 111, of a change in the PTAT voltage, the dynamic calibration module is configured to generate a next trim value by one of adding a least significant bit to, or subtracting a bit from, the current trim value and is configured to provide the generated next trim value to the trim circuit. Thus, as the first comparator and/or the second comparator indicate that the PTAT voltage has left the current voltage range and thereby entered an adjacent voltage range, the dynamic calibration module 111 may be configured to modify the previous trim value in order to generate the trim value for the said adjacent voltage range. It will be appreciated that this assumes that the difference in modification between adjacent voltage ranges is one bit. However, in other examples, this need not be the case and there may be multiple bits of different between the trim value for one range and the trim value for an adjacent voltage range.

In the example of FIG. 2, the dynamic calibration module 111 includes a third comparator 242. The third comparator 242 is optional and may be used to determine which side of the peak of the voltage reference "curve" 301 the BGVR circuit is currently on. As explained previously, the curve 303 shows how the voltage reference varies with temperature if it were not calibrated by the dynamic calibration module 111. On the left side of the curve 301, it can be seen from FIG. 3 that the calibration required for decreasing temperature is increasing with the decreasing temperature (i.e. more bits are added to the predetermined calibration value the further from the peak). On the right side of the curve 301, it can be seen from FIG. 3 that the calibration required for increasing temperature is increasing with increasing temperature (i.e. more bits are added to the predetermined calibration value the further to the right from the peak). Thus, the third comparator 242 is configured to determine if bits need subtracting from the current trim value to generate the next trim value (such as when temperature is increasing but on the left-hand side of the curve) and determine if bits need adding to the current trim value to generate the next trim value (such as when temperature is increasing but on the right-hand side of the curve 301).

Thus, in this "relative change" mode of operation with the third comparator, the dynamic calibration module comprises:
the first comparator 240 configured to determine when the PTAT voltage increases, such as above the upper limit voltage for the current voltage range;
the second comparator configured to determine when the PTAT voltage decreases, such as below the lower limit voltage for the current voltage range; and
the third comparator 242 configured to determine whether the PTAT voltage from 102 is above or below a predetermined threshold, which corresponds to the peak of the bandgap curve 301.

Accordingly, the logic module 243 of the dynamic calibration module 111 is configured to, if the third comparator 242 determines that the PTAT voltage is below the predetermined threshold, then an increase in the PTAT voltage determined by the first comparator 240 is configured to provide for adding of the one or more bits to the previous trim value to generate the current trim value. Further, a decrease in the PTAT voltage determined by the second comparator 241 is configured to provide for subtracting of the one or more bits from the previous trim value to generate the current trim value.

Thus, if the third comparator 241 determines that the PTAT voltage is above the predetermined threshold, then an increase in the PTAT voltage determined by the first comparator 240 is configured to provide for subtracting of the one or more bits from the previous trim value to generate the current trim value and a decrease in the PTAT voltage determined by the second comparator 241 is configured to provide for adding of the one or more bits to the previous trim value to generate the current trim value.

In summary, the closer the temperature (as indicated by the PTAT voltage) is to the peak of the bandgap curve 301 the smaller the modification to the predetermined calibration value to generate the trim value, assuming that the predetermined calibration value is calibrated at the temperature of said peak. Thus, if the temperature is on the left hand side of the curve 301, increases in temperature may result in generation of a trim value that deviates less from the predetermined calibration value compared to the previous trim value. However, if the temperature is on the right hand side of the curve 301, increases in temperature may result in generation of a trim value that deviates more from the predetermined calibration value compared to the previous trim value.

The example of FIG. 2 also shows trim value generation logic 260 or, put another way, predetermined calibration value modification logic. The logic 260 is configured to receive the predetermined calibration value from the memory 110 and add or subtract the predetermined number of bits determined by the logic module 243. Thus, the logic module 243 may be configured to output an instruction to the logic 260 to cause it to one of add or subtract, to/from the predetermined calibration value, a number of bits that correspond to whichever of the ranges the PTAT voltage is determined to be within. The trim value generated by the logic 260 is provided to the trim circuit 105.

Figure 5:
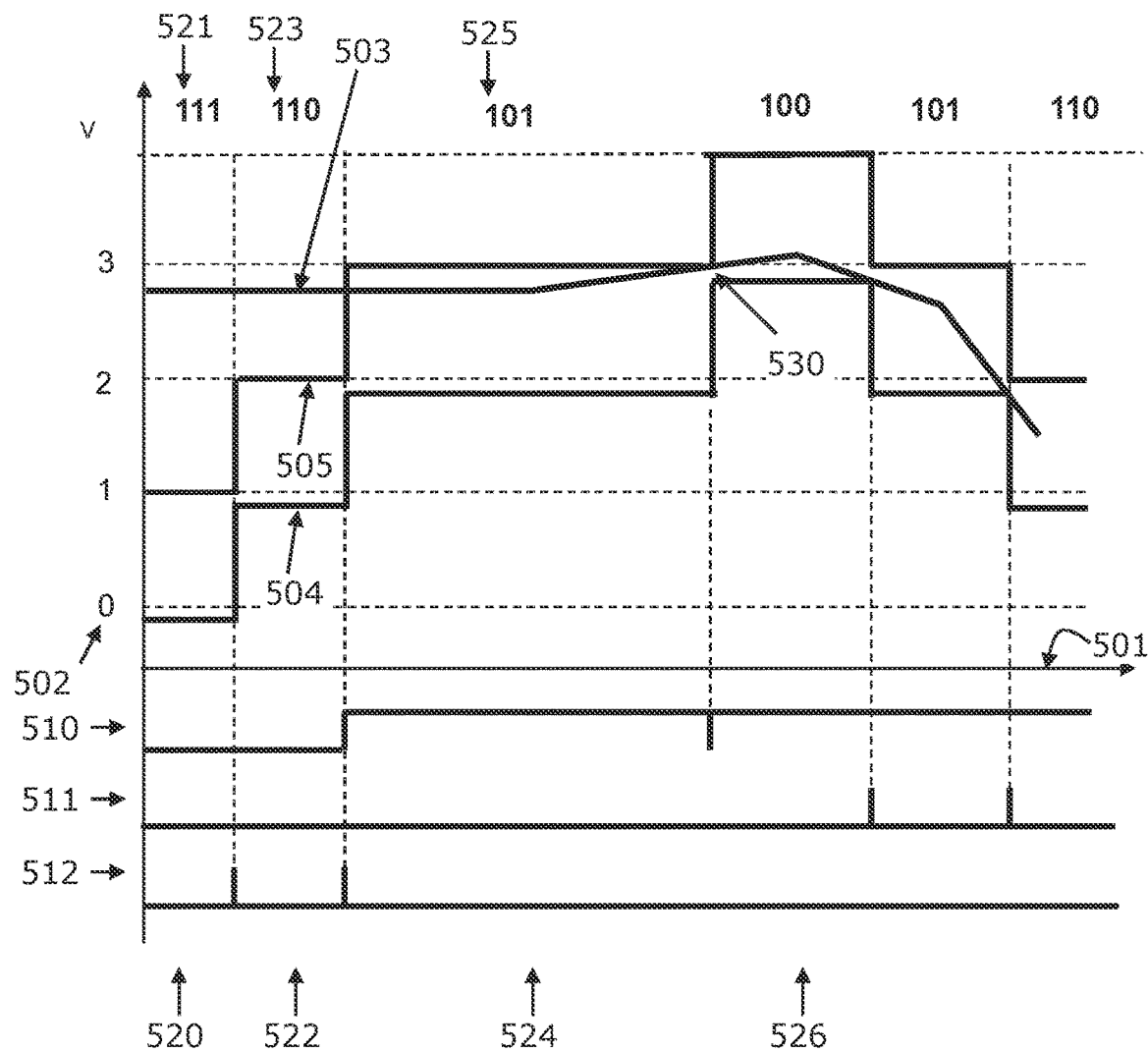
FIG. 5 shows an example of operation of the apparatus of FIG. 2.
Figure 6:
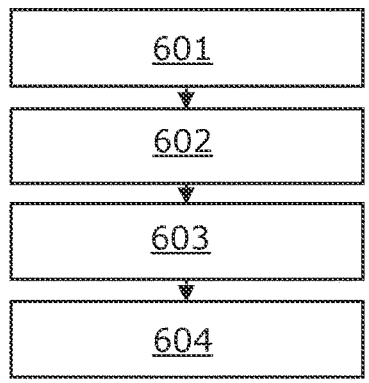
FIG. 6 shows an example method.

FIG. 5 illustrates an example of the apparatus 100 in use. The x-axis 501 shows time. The upper part of the y-axis 502 represents voltage and shows the PTAT voltage 503 from terminal 102 and the changing upper limit voltages as line 504 and the changing lower limit voltages as line 505.

The lower part of the y-axis shows the output of the first comparator 240 as line 510, the output of the second comparator 241 as line 511 and an initialization signal as line 512.

The dynamic calibration module 111 is configured to provide a start-up-routine to discover which of the contiguous set of voltage ranges is the current voltage range. Thus, the start-up-routine comprise stepping through the contiguous set of voltage ranges by setting the current voltage range to be different ones of the set of voltage ranges until one or both of the signals 510 and 511 are indicative of the PTAT voltage being within the current voltage range.

Thus, at time 520, the line 504 shows the lower limit voltage being set to that of the lowest "candidate" range of the set of voltage ranges. In this "candidate" voltage range, the trim value is set to "111" as shown at 521. The signals 510 and 511 are both low, which in this example indicates that the PTAT voltage 503 is not in the "candidate" voltage range between 504 and 505 at time 520.

At time 522, the logic module 243 has provided an initialization signal (a spike) that causes the dynamic calibration module 111 to step to the next "candidate" voltage range. Accordingly, at time 522, the lower limit voltage 504 increases to that of the next "candidate" voltage range and the upper limit voltage 505 increases to that of the same, next "candidate" voltage range. In this next "candidate" voltage range, the trim value is set to "110" as shown at 523. The signals 510 and 511 are both low, which in this example indicates that the PTAT voltage 503 is not in the next "candidate" voltage range either between 504 and 505 at time 522.

At time 524, the logic module 243 has provided an initialization signal (a spike) that causes the dynamic calibration module 111 to step to the second next "candidate" voltage range. Accordingly, at time 524, the lower limit voltage 504 increases to that of the second next "candidate" voltage range and the upper limit voltage 505 increases to that of the same, second next "candidate" voltage range. In this second next "candidate" voltage range, the trim value is set to "101" as shown at 525. The signal 510 has gone high and the signal 511 is low, which in this example indicates that the PTAT voltage 503 is within the second next "candidate" voltage range at time 524. Thus, the current voltage range has been found. The dynamic calibration module 111 may now operate as described above by detecting subsequent changes in the PTAT voltage 503 relative to the upper and lower limit voltages 504, 505 and changing the trim value accordingly. Thus, at time 526, the signal 510 has provided an indication (i.e. the downward spike just before time 526) that the PTAT voltage 503 has exceeded the upper limit voltage 505 set for time 524. Thus, the current voltage range changes and trim value is changed accordingly to "100" in this example. Further, the upper limit voltage 505 and the lower limit voltage 504 are also updated for the changed current voltage range.

In one or more examples, the upper limit voltage 505 for a first voltage range of the set of voltage ranges is greater than the lower limit voltage 504 for a second voltage range of the set of voltage ranges, wherein the second voltage range is a directly adjacent the first voltage range in the set of voltage ranges. This can be seen in FIG. 4 by virtue of the small gap 527. The provision of an offset between the upper limit voltage 505 and the lower limit voltage 504 for adjacent voltage ranges may prevent unwanted jumping back and forth between voltage ranges when the PTAT voltage 503 is on a border between ranges.

We also disclose a method, the method comprising operating an apparatus for determining temperature, the apparatus comprising the apparatus 100: wherein the method comprises, by a dynamic calibration module,
 receiving 601 the PTAT voltage;
 detecting 602 a change in the PTAT voltage,
 generating 603 the trim value by one of adding or subtracting one or more bits from the predetermined calibration value and providing the generated trim value to the trim circuit; and
 outputting 604 a signal indicative of temperature based on the PTAT voltage and the reference voltage.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through a network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus for determining temperature comprising:
a proportional to absolute temperature, PTAT, circuit configured to provide a PTAT voltage comprising a voltage proportional to absolute temperature;
a bandgap voltage reference circuit, BGVR circuit, configured to generate a voltage across a sense-resistor wherein a reference voltage is provided between a first terminal and a second terminal of the BGVR circuit, wherein the first terminal and the second terminal couple to the sense-resistor;
a calibration circuit for calibrating the BGVR circuit, comprising:
a memory configured to store a predetermined calibration value as a digital word comprising a plurality of bits for use in calibration of the bandgap voltage reference circuit;
a trim circuit configured to receive a trim value based on the predetermined calibration value to control where one or both of the first terminal and the second terminal couple to the sense-resistor for said calibration and the provision of the reference voltage;
a dynamic calibration module configured to receive the PTAT voltage and based on detection of a change in the PTAT voltage, generate the trim value by one of adding or subtracting a predetermined number of bits from the predetermined calibration value and provide the generated trim value to the trim circuit;
wherein the apparatus comprises an output configured to provide a signal indicative of temperature based on the PTAT voltage and the reference voltage.

2. The apparatus of claim 1, wherein the predetermined number of bits added to or subtracted from the predetermined calibration value by the dynamic calibration module comprise a subset of the plurality of bits of the digital word.

3. The apparatus of claim 2, wherein the logic module is configured to determine which of a plurality contiguous voltage ranges the PTAT voltage is within and wherein the predetermined number of bits to one of add or subtract from the predetermined calibration value is based on the determined voltage range, wherein each voltage range of the plurality contiguous voltage ranges is associated with a digital word defining the predetermined number of bits to one of add or subtract.

4. The apparatus of claim 2, wherein the memory is configured to store the trim value generated by the dynamic calibration module as a current trim value, and wherein based on the detection, by the dynamic calibration module, of the change in the PTAT voltage, the dynamic calibration module is configured to generate a next trim value by one of adding a least significant bit to, or subtracting a least significant bit from, the current trim value and is configured to provide the generated next trim value to the trim circuit.

5. The apparatus of claim 2, wherein the dynamic calibration module is configured to determine a current voltage range, the current voltage range comprising a voltage range of a contiguous set of voltage ranges that the PTAT voltage is within, wherein each voltage range is defined by a lower limit voltage and an upper limit voltage; and
wherein said detection of the change in the PTAT voltage by the dynamic calibration module comprises detection of a change in the PTAT voltage that results in the PTAT voltage leaving the current voltage range of the contiguous set of voltage ranges; and
wherein at least two voltage ranges of the set of voltage ranges corresponds to the addition or the subtraction of a different predetermined number of bits from the predetermined calibration value to generate the trim value.

6. The apparatus of claim 1, wherein the logic module is configured to determine which of a plurality contiguous voltage ranges the PTAT voltage is within and wherein the predetermined number of bits to one of add or subtract from the predetermined calibration value is based on the determined voltage range, wherein each voltage range of the plurality contiguous voltage ranges is associated with a digital word defining the predetermined number of bits to one of add or subtract.

7. The apparatus of claim 6, wherein the dynamic calibration module is configured to determine a current voltage range, the current voltage range comprising a voltage range of a contiguous set of voltage ranges that the PTAT voltage is within, wherein each voltage range is defined by a lower limit voltage and an upper limit voltage; and
wherein said detection of the change in the PTAT voltage by the dynamic calibration module comprises detection of a change in the PTAT voltage that results in the PTAT voltage leaving the current voltage range of the contiguous set of voltage ranges; and
wherein at least two voltage ranges of the set of voltage ranges corresponds to the addition or the subtraction of a different predetermined number of bits from the predetermined calibration value to generate the trim value.

8. The apparatus of claim 1, wherein the memory is configured to store the trim value generated by the dynamic calibration module as a current trim value, and wherein based on the detection, by the dynamic calibration module, of the change in the PTAT voltage, the dynamic calibration module is configured to generate a next trim value by one of adding a least significant bit to, or subtracting a least significant bit from, the current trim value and is configured to provide the generated next trim value to the trim circuit.

9. The apparatus of claim 1, wherein the dynamic calibration module comprises:
a first comparator configured to determine when the PTAT voltage increases;
a second comparator configured to determine when the PTAT voltage decreases;
a third comparator configured to determine whether the PTAT voltage is above or below a predetermined threshold;
and wherein the dynamic calibration module is configured to:
if the third comparator determines that the PTAT voltage is below the predetermined threshold, an increase in the PTAT voltage determined by the first comparator is configured to provide for the adding or subtracting the one or more bits to the predetermined calibration value to generate the trim value such that it deviates less from the predetermined calibration value and a decrease in the PTAT voltage determined by the second comparator is configured to provide for the adding or subtracting of the one or more bits from the predetermined calibration value to generate trim value that deviates more from the predetermined calibration value; and
if the third comparator determines that the PTAT voltage is above the predetermined threshold, an increase in the PTAT voltage determined by the first comparator is configured to provide for adding or subtracting of the one or more bits from the predetermined calibration value to generate the trim value such that it deviates more from the predetermined calibration value and a decrease in the PTAT voltage determined by the second comparator is configured to provide for adding or subtracting of the one or more bits to the predetermined calibration value to generate the trim value such that it deviates less from the predetermined calibration value.

10. The apparatus of claim 1, wherein the trim circuit comprises at least a first switch and a second switch, wherein the first switch is configured to selectively couple the first terminal to a plurality of different positions along the sense-resistor, and the second switch is configured to selectively couple the second terminal to a plurality of different positions along the sense-resistor, wherein the position to which each of the first switch and second switch selectively couple along the sense-resistor determine the resistance thereof and thereby the reference voltage provided between the first terminal and the second terminal.

11. The apparatus of claim 1, wherein the dynamic calibration module is configured to determine a current voltage range, the current voltage range comprising a voltage range of a contiguous set of voltage ranges that the PTAT voltage is within, wherein each voltage range is defined by a lower limit voltage and an upper limit voltage; and
wherein said detection of the change in the PTAT voltage by the dynamic calibration module comprises detection of a change in the PTAT voltage that results in the PTAT voltage leaving the current voltage range of the contiguous set of voltage ranges; and
wherein at least two voltage ranges of the set of voltage ranges corresponds to the addition or the subtraction of a different predetermined number of bits from the predetermined calibration value to generate the trim value.

12. The apparatus of claim 11, wherein the dynamic calibration module comprises:
a first comparator configured to receive the PTAT voltage and the upper limit voltage for the current voltage range and determine if the PTAT voltage is outside the current voltage range by virtue of it being greater than the upper limit voltage of the current voltage range; and
a second comparator configured to receive the PTAT voltage and the lower limit voltage for the current voltage range and determine if the PTAT is outside the current voltage range by virtue of it being less than the lower limit voltage of the current voltage range; and
wherein the dynamic calibration module is configured to:
(i) change the trim value based on the output of one or both of the first comparator and the second comparator indicating the PTAT voltage has changed to a new PTAT voltage that is outside the current voltage range;
(ii) update the current voltage range to an adjacent voltage range in the contiguous set of voltage ranges and thereby change the lower limit voltage and the upper limit voltage provided to the first comparator and the second comparator to those associated with said adjacent voltage range.

13. The apparatus of claim 11, wherein the dynamic calibration module includes a circuit configured to generate a reference voltage across a second sense-resistor, the second sense-resistor comprising a voltage divider having a plurality of voltage tapping points that are provided to define the upper limit voltage and the lower limit voltage for each of the contiguous set of voltage ranges; and
wherein the dynamic calibration module includes a plurality of switches configured to:
couple the first comparator to one of the voltage tapping points corresponding to the upper limit voltage for the current voltage range; and
couple the second comparator to a different one of the voltage tapping points corresponding to the lower limit voltage for the current voltage range.

14. The apparatus of claim 11, wherein at least one of the voltage ranges of the set of contiguous voltage ranges differs in size in terms of the voltage range between the lower limit voltage and the upper limit voltage than one other of the voltage ranges of the set of contiguous voltage ranges.

15. The apparatus of claim 11, wherein the dynamic calibration module comprises:
a first comparator configured to determine when the PTAT voltage increases;
a second comparator configured to determine when the PTAT voltage decreases;
a third comparator configured to determine whether the PTAT voltage is above or below a predetermined threshold;
and wherein the dynamic calibration module is configured to:
if the third comparator determines that the PTAT voltage is below the predetermined threshold, an increase in the PTAT voltage determined by the first comparator is configured to provide for the adding or subtracting the one or more bits to the predetermined calibration value to generate the trim value such that it deviates less from the predetermined calibration value and a decrease in the PTAT voltage determined by the second comparator is configured to provide for the adding or subtracting of the one or more bits from the predetermined calibration value to generate trim value that deviates more from the predetermined calibration value; and
if the third comparator determines that the PTAT voltage is above the predetermined threshold, an increase in the PTAT voltage determined by the first comparator is configured to provide for adding or subtracting of the one or more bits from the predetermined calibration value to generate the trim value such that it deviates more from the predetermined calibration value and a decrease in the PTAT voltage determined by the second comparator is configured to provide for adding or subtracting of the one or more bits to the predetermined calibration value to generate the trim value such that it deviates less from the predetermined calibration value.

16. The apparatus of claim 12, wherein the dynamic calibration module is configured to provide a start-up-routine, the start-up-routine comprising:
stepping through the contiguous set of voltage ranges by defining a candidate voltage range as different ones of the set of voltage ranges until one or both of the first comparator and second comparator are indicative of the PTAT voltage being within the candidate voltage range.

17. The apparatus of claim 12 wherein the dynamic calibration module includes a logic module configured to receive the output of at least the first comparator and the second comparator and generate a control signal to add or subtract bits from the predetermined calibration value to generate the trim value.

18. The apparatus of claim 1, wherein the BGVR circuit comprises a first transistor, a second transistor, and a comparator, wherein the first transistor comprises a first terminal coupled to a voltage supply terminal, a second terminal coupled to a first terminal of the sense-resistor, and a third, control, terminal coupled to the output of the comparator;
the second transistor comprises a first terminal coupled to a second terminal of the sense-resistor, a second terminal of the second transistor coupled to a reference voltage terminal, and a third, control, terminal coupled to an input of a summing module that provides the PTAT voltage;
wherein the summing module is configured to provide the PTAT voltage at its output to a first terminal of the comparator and wherein the input to the summing module is coupled to one of the first terminal and the second terminal of the BGVR circuit; and
wherein a second terminal of the comparator is coupled to the other of the first terminal and the second terminal of the BGVR circuit, and the second terminal of the comparator also couples to the PTAT circuit.

19. The apparatus of claim 18, wherein the PTAT circuit comprises:
the summing module and a follower arrangement comprising:
a first transistor having a first terminal coupled to a voltage supply terminal a second terminal coupled to a PTAT output and a control terminal coupled to the comparator of the BGVR circuit;
a second transistor having a first terminal coupled to the voltage supply terminal and a third transistor, a second terminal coupled to the PTAT output and a control terminal coupled to the third transistor;
wherein the PTAT output is coupled to the reference voltage terminal via a direct current source and wherein the PTAT voltage is provided between the direct current source and the second terminals of the first and second transistors.

20. A method of operating an apparatus, wherein the apparatus includes:
a proportional to absolute temperature, PTAT, circuit configured to provide a PTAT voltage comprising a voltage proportional to absolute temperature;
a bandgap voltage reference circuit, BGVR circuit, configured to generate a voltage across a sense-resistor wherein a reference voltage is provided between a first terminal and a second terminal of the BGVR circuit, wherein the first terminal and the second terminal couple to the sense-resistor;
a calibration circuit for calibrating the BGVR circuit, comprising:
a memory configured to store a predetermined calibration value as a digital word comprising a plurality of bits for use in calibration of the bandgap voltage reference circuit;
a trim circuit configured to receive a trim value based on the predetermined calibration value to control where one or both of the first terminal and the second terminal couple to the sense-resistor for said calibration and the provision of the reference voltage;
a dynamic calibration module configured to receive the PTAT voltage and based on detection of a change in the PTAT voltage, generate the trim value by one of adding or subtracting a predetermined number of bits from the predetermined calibration value and provide the generated trim value to the trim circuit;
wherein the apparatus comprises an output configured to provide a signal indicative of temperature based on the PTAT voltage and the reference voltage;
wherein the method comprising:
receiving a proportional to absolute temperature, PTAT, voltage from a PTAT circuit;
detecting a change in the PTAT voltage,
generating a trim value by a calibration module, by one of adding or subtracting a
predetermined number of bits from a predetermined calibration value and providing the generated trim value to a trim circuit; and
outputting a signal indicative of temperature based on the PTAT voltage and the reference voltage.

* * * * *